US009485767B2

(12) United States Patent
Wagholikar et al.

(10) Patent No.: US 9,485,767 B2
(45) Date of Patent: *Nov. 1, 2016

(54) METHOD AND APPARATUS FOR FACILITATING THE COEXISTENCE OF WIRELESS COMMUNICATIONS OF DIFFERENT WIRELESS COMMUNICATION TECHNOLOGIES

(71) Applicant: Marvell World Trade Ltd., St. Michael (BB)

(72) Inventors: Sarang Shrikrishna Wagholikar, Sunnyvale, CA (US); Harish Ramamurthy, Cupertino, CA (US); Rajesh Shreeram Bhagwat, Los Gatos, CA (US); Matthew L. Semersky, Santa Clara, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,000

(22) Filed: May 1, 2015

(65) Prior Publication Data

US 2015/0237625 A1 Aug. 20, 2015

Related U.S. Application Data

(63) Continuation of application No. 13/458,227, filed on Apr. 27, 2012, now Pat. No. 9,026,162.

(60) Provisional application No. 61/481,079, filed on Apr. 29, 2011.

(51) Int. Cl.
*H04W 72/04* (2009.01)
*H04L 5/00* (2006.01)
*H04W 84/12* (2009.01)

(52) U.S. Cl.
CPC ........ *H04W 72/0446* (2013.01); *H04L 5/0092* (2013.01); *H04W 84/12* (2013.01)

(58) Field of Classification Search
CPC ......... H04M 2203/2044; H04W 4/08; H04W 84/12; H04L 5/0092
USPC ....................................................... 455/514
See application file for complete search history.

(56) References Cited

U.S. PATENT DOCUMENTS

| 7,046,649 B2 * | 5/2006 | Awater | H04W 16/14 370/338 |
| 7,092,428 B2 * | 8/2006 | Chen | H04B 1/7143 375/132 |

(Continued)

FOREIGN PATENT DOCUMENTS

| CN | 101569139 A | 10/2009 |
| JP | 2009500988 A | 1/2009 |

(Continued)

OTHER PUBLICATIONS

Notification of Transmittal of The International Search Report and The Written Opinion of The International Searching Authority, or The Declaration dated Aug. 6, 2012 in reference to PCT/US2012/035597 (13 pgs).

(Continued)

*Primary Examiner* — Hai V Nguyen

(57) ABSTRACT

A first wireless communication device including a first transceiver and a second transceiver. The first transceiver is configured to transmit first signals according to a first wireless communication technology. The second transceiver is configured to transmit second signals according to a second wireless communication technology. Memory is configured to store a schedule that identifies first intervals for allowing communication using the first signals and second intervals for allowing communication using the second signals. A coexistence circuit is configured to allow the first transceiver to transmit the first signals only during the first intervals, allow the second transceiver to transmit the second signals only during the second intervals, and cause the first transceiver to transmit, prior to each of the second intervals, a message that indicates a duration of a respective one of the second intervals.

10 Claims, 12 Drawing Sheets

(56) References Cited

U.S. PATENT DOCUMENTS

| | | | | |
|---|---|---|---|---|
| 7,463,592 B2 * | 12/2008 | Poncini | H04W 24/00 | 370/252 |
| 7,664,085 B2 * | 2/2010 | Waxman | H04W 16/14 | 370/230 |
| 7,717,342 B2 * | 5/2010 | Wang | H04W 84/18 | 235/462.01 |
| 7,725,118 B2 * | 5/2010 | Yang | H04W 16/14 | 370/447 |
| 7,734,253 B2 * | 6/2010 | Chen | H04W 28/06 | 370/252 |
| 7,826,411 B2 * | 11/2010 | Gonikberg | H04W 8/005 | 370/328 |
| 7,881,746 B2 * | 2/2011 | Desai | H04W 72/1215 | 370/338 |
| 7,966,037 B2 * | 6/2011 | Rayzman | H04W 72/06 | 455/41.2 |
| 7,983,216 B2 * | 7/2011 | Iyer | H04W 16/10 | 370/329 |
| 8,045,922 B2 * | 10/2011 | Sherman | H04W 16/14 | 370/328 |
| 8,046,024 B2 * | 10/2011 | Sudak | H04W 52/287 | 455/40 |
| 8,072,913 B2 * | 12/2011 | Desai | H04W 52/0225 | 370/311 |
| 8,085,737 B2 * | 12/2011 | Zhu | H04W 72/1215 | 370/336 |
| 8,089,922 B2 * | 1/2012 | Gonikberg | H04W 8/005 | 370/328 |
| 8,121,144 B2 * | 2/2012 | Bitran | H04W 72/1257 | 370/201 |
| 8,126,502 B2 * | 2/2012 | Trainin | H04W 16/14 | 370/338 |
| 8,155,695 B2 * | 4/2012 | Wang | H04W 72/1215 | 370/338 |
| 8,165,102 B1 * | 4/2012 | Vleugels | H04W 88/08 | 370/338 |
| 8,189,526 B2 * | 5/2012 | Hsu | H04W 74/02 | 370/329 |
| 8,219,142 B2 * | 7/2012 | Khairmode | H04W 88/06 | 455/552.1 |
| 8,238,292 B2 * | 8/2012 | Gonikberg | H04W 8/005 | 370/328 |
| 8,256,681 B2 * | 9/2012 | Wang | H04W 84/18 | 235/462.01 |
| 8,447,350 B2 * | 5/2013 | Khairmode | H04W 88/06 | 455/552.1 |
| 8,451,776 B2 * | 5/2013 | Dayal | H04W 16/14 | 370/328 |
| 8,483,139 B2 * | 7/2013 | Gonikberg | H04W 8/005 | 370/328 |
| 8,493,966 B2 * | 7/2013 | Bendelac | H04L 12/5692 | 370/352 |
| 8,493,992 B2 * | 7/2013 | Sella | H04W 24/10 | 370/252 |
| 8,496,181 B2 * | 7/2013 | Wang | H04W 84/18 | 235/462.25 |
| 8,526,348 B2 * | 9/2013 | Desai | H04W 52/0225 | 370/311 |
| 8,537,798 B2 * | 9/2013 | Tsfati | H04W 72/1215 | 370/338 |
| 8,537,799 B2 * | 9/2013 | Tsfati | H04W 72/1215 | 370/338 |
| 8,599,814 B1 * | 12/2013 | Vleugels | H04W 88/08 | 370/338 |
| 8,619,732 B2 * | 12/2013 | Khairmode | H04W 88/06 | 370/338 |
| 8,626,067 B2 * | 1/2014 | Ko | H04W 72/1215 | 455/41.2 |
| 8,655,278 B2 * | 2/2014 | Laroche | H04W 48/16 | 455/168.1 |
| 8,665,848 B2 * | 3/2014 | Wentink | H04W 48/10 | 370/338 |
| 8,711,821 B2 * | 4/2014 | Grandhi | H04B 7/0626 | 370/254 |
| 8,730,927 B2 * | 5/2014 | Thoukydides | H04B 1/406 | 370/338 |
| 8,750,926 B2 * | 6/2014 | Fu | H04B 1/406 | 370/229 |
| 8,767,616 B2 * | 7/2014 | Choi | G01S 19/03 | 370/312 |
| 8,781,519 B2 * | 7/2014 | Burchill | H04W 52/18 | 370/318 |
| 8,805,303 B2 * | 8/2014 | Koo | H04W 16/14 | 370/310 |
| 8,842,618 B2 * | 9/2014 | Yu | H04W 52/265 | 370/329 |
| 8,913,599 B2 * | 12/2014 | Gonikberg | H04W 28/10 | 370/329 |
| 9,026,162 B2 * | 5/2015 | Wagholikar | H04W 72/1215 | 370/328 |
| 2001/0010689 A1 * | 8/2001 | Awater | H04W 16/14 | 370/344 |
| 2004/0259589 A1 * | 12/2004 | Bahl | H04W 16/14 | 455/553.1 |
| 2005/0025174 A1 | 2/2005 | Fischer et al. | | |
| 2005/0038876 A1 * | 2/2005 | Chaudhuri | G06F 17/3087 | 709/219 |
| 2005/0215197 A1 * | 9/2005 | Chen | H04W 28/06 | 455/41.2 |
| 2006/0111042 A1 * | 5/2006 | Pitchers | H04L 12/2803 | 455/20 |
| 2008/0139212 A1 * | 6/2008 | Chen | H04W 72/1215 | 455/450 |
| 2008/0181154 A1 * | 7/2008 | Sherman | H04W 48/16 | 370/311 |
| 2008/0279138 A1 * | 11/2008 | Gonikberg | H04W 8/005 | 370/328 |
| 2008/0279162 A1 * | 11/2008 | Desai | H04W 72/1215 | 370/338 |
| 2008/0279163 A1 | 11/2008 | Desai | | |
| 2008/0287158 A1 * | 11/2008 | Rayzman | H04W 72/06 | 455/552.1 |
| 2009/0067396 A1 * | 3/2009 | Fischer | H04L 1/1854 | 370/338 |
| 2009/0137206 A1 * | 5/2009 | Sherman | H04W 16/14 | 455/41.2 |
| 2009/0147763 A1 * | 6/2009 | Desai | H04B 1/0064 | 370/343 |
| 2009/0196210 A1 * | 8/2009 | Desai | H04W 52/0225 | 370/311 |
| 2009/0240998 A1 * | 9/2009 | Nikkila | H04L 12/6418 | 714/746 |
| 2009/0245279 A1 | 10/2009 | Wan et al. | | |
| 2010/0029325 A1 * | 2/2010 | Wang | H04W 72/1215 | 455/553.1 |
| 2010/0135256 A1 * | 6/2010 | Lee | H04W 16/14 | 370/336 |
| 2010/0322222 A1 * | 12/2010 | Desai | H04W 72/1215 | 370/338 |
| 2011/0097998 A1 * | 4/2011 | Ko | H04W 72/1215 | 455/41.2 |
| 2011/0116488 A1 * | 5/2011 | Grandhi | H04B 7/0626 | 370/338 |
| 2011/0188391 A1 * | 8/2011 | Sella | H04W 24/10 | 370/252 |
| 2011/0205924 A1 * | 8/2011 | Gonikberg | H04W 16/14 | 370/252 |
| 2011/0274040 A1 * | 11/2011 | Pani | H04W 4/005 | 370/328 |
| 2011/0312288 A1 * | 12/2011 | Fu | H04B 1/406 | 455/88 |
| 2012/0071103 A1 * | 3/2012 | Kadous | H04W 52/243 | 455/63.1 |
| 2012/0087341 A1 * | 4/2012 | Jang | H04W 28/04 | 370/331 |
| 2012/0106419 A1 * | 5/2012 | Gonikberg | H04W 8/005 | 370/311 |
| 2012/0115420 A1 * | 5/2012 | Trainin | H04W 16/14 | 455/41.2 |
| 2012/0155437 A1 * | 6/2012 | Kuo | H04B 1/406 | 370/336 |
| 2012/0170556 A1 * | 7/2012 | Tsfati | H04W 72/1215 | 370/338 |

(56) References Cited

U.S. PATENT DOCUMENTS

| | | | | |
|---|---|---|---|---|
| 2012/0170557 A1* | 7/2012 | Tsfati | ............... | H04W 72/1215 370/338 |
| 2012/0176924 A1* | 7/2012 | Wu | ................... | H04W 72/0406 370/252 |
| 2012/0207040 A1* | 8/2012 | Comsa | ............. | H04W 72/1215 370/252 |
| 2012/0213116 A1* | 8/2012 | Koo | ..................... | H04B 1/1027 370/253 |
| 2012/0213162 A1* | 8/2012 | Koo | ..................... | H04W 16/14 370/329 |
| 2012/0213208 A1* | 8/2012 | Hsu | ....................... | H04W 74/02 370/336 |
| 2012/0250662 A1* | 10/2012 | Kuo | ....................... | H04W 4/20 370/336 |
| 2012/0269181 A1* | 10/2012 | Gonikberg | ............ | H04W 8/005 370/336 |
| 2012/0276938 A1* | 11/2012 | Wagholikar | ...... | H04W 72/1215 455/514 |
| 2012/0294396 A1* | 11/2012 | Desai | .................... | H04L 5/0062 375/343 |
| 2013/0010766 A1* | 1/2013 | Sadek | ............... | H04W 72/1215 370/336 |
| 2013/0130684 A1* | 5/2013 | Gomes | .................. | H04W 8/186 455/435.1 |
| 2013/0225068 A1* | 8/2013 | Kiminki | ............ | H04W 52/0216 455/39 |
| 2013/0287043 A1* | 10/2013 | Nanda | ............... | H04L 29/06068 370/467 |
| 2013/0301420 A1* | 11/2013 | Zhang | ................. | H04W 76/048 370/241 |
| 2014/0003318 A1* | 1/2014 | Desai | ................ | H04W 52/0225 370/311 |
| 2014/0043966 A1* | 2/2014 | Lee | ....................... | H04W 28/08 370/230 |
| 2014/0087663 A1* | 3/2014 | Burchill | .............. | H04W 52/287 455/41.2 |
| 2014/0126552 A1* | 5/2014 | Dayal | ................... | H04W 88/06 370/336 |
| 2015/0065157 A1* | 3/2015 | Homchaudhuri | ... | H04W 72/082 455/452.1 |
| 2015/0139015 A1* | 5/2015 | Kadous | ................. | H04W 24/08 370/252 |

FOREIGN PATENT DOCUMENTS

| | | | |
|---|---|---|---|
| JP | 2010166354 A | 7/2010 | |
| WO | WO-2006090254 A1 | 8/2006 | |
| WO | WO-2007008981 A1 | 1/2007 | |
| WO | WO-2008070777 A2 | 6/2008 | |
| WO | WO 2009101567 A1 * | 8/2009 | ........ H04W 72/1215 |
| WO | WO-2009101567 A1 | 8/2009 | |

OTHER PUBLICATIONS

IEEE Std 802.11a-1999 (Supplement to IEEE Std 802.Nov. 1999) Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band; LAN/MAN Standards Committee of the IEEE Computer Society; Sep. 16, 1999; 91 pages.

IEEE Std. 802.11b; Supplement to IEEE Standard for Information technology—Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 2009; 96 pages.

IEEE P802.11g/D8.2 Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; Apr. 2003; 69 pages.

IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.

IEEE P802.11n: TGn Sync Proposal Technical Specifications; Syed Aon Mujtaba; IEEE 802.11-04/0889r6; May 2005; 131 pages.

IEEE P802.11ac / D2.0; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Jan. 2012; 359 pages.

Kiran Gunnam et al.; "Multi-Rate Layered Decoder Architecture for Block LDPC Codes of the IEEE 802.11n Wireless Standard"; 2007; pp. 1645-1648.

IEEE Std P802.11af/D1.05 Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation; The Institute of Electrical and Electronics Engineers, Inc., Nov. 2011; 123 pages.

IEEE P802.11ad / D5.0 (Draft Amendment based on IEEE P802.11REVmb D10.0) (Amendment to IEEE 802.11REVmb D10.0 as amended by IEEE 802.11ae D5.0 and IEEE 802.11aa D6.0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput in the 60 GHz Band; Sponsor IEEE 802.11 Committee of the IEEE Computer Society; Sep. 2011; 601 pages.

IEEE P802.11ah™/D1.0 Draft Standard for Information technology—Telecommunications and information exchange between systems Local and metropolitan area networks—Specific requirements Part 11: Wireless LAN Medium Access Control (MAC) and Physical Layer (PHY) Specifications, Amendment 6: Sub 1 GHz License Exempt Operation, 802.11 Working Group of the LAN/MAN Standards Committee of the IEEE Computer Society, Oct. 2013, 394 pages.

IEEE P802.11e/D11.0, Oct. 2004 (Amendment to ANSI/IEEE Std 802.11®-1999 (2003 Reaff) edition as amended by IEEE Std 802.11g-2003, IEEE Stad 802.11h-2003 and IEEE 802.11i-2004); IEEE Standard for Information technology—Telecommunications and information exchange between systems—Local and metropolitan area networks—Specific requirements Part 11: Wireless Medium Access Control (MAC) and Physical Layer (PHY) specifications: Amendment 7: Medium Access Control (MAC) Quality of Service (QoS) Enhancements; LAN/MAN Committee of the IEEE Computer Society; 195 pages.

IEEE Std 802.11i.-2004; Jul. 23, 2004; 802.11i IEEE Standard for Information technology. Telecommunications and information exchange between systems. Local and metropolitan area networks. Specific requirements; Part 11: Wireless LAN Medium Access Control (MAC) and Physical Layer (PHY) specifications; Amendment 6: Medium Access Control (MAC) Security Enhancements; IEEE Computer Society, 190 pages.

IEEE Std 802.11k-2008 (Amendment to IEEE Std 802.Nov. 2007), Jun. 12, 2008, IEEE Standard for Information technology—Telecommunications and information exchange between systems—Local and metropolitan area networks—Specific requirements; Part 11: Wireless LAN Medium Access Control (MAC) and Physical Layer (PHY) Specifications Amendment 1: Radio Resource Mea-

(56) References Cited

OTHER PUBLICATIONS surement of Wireless LANs; IEEE Computer Society Sponsored by the LAN/MAN Standards Committee; 244 pages.

IEEE P802.11v/D14.0—Draft Standard for Information Technology—Telecommunications and information exchange between systems—Local and metropolitan area networks—Specific Requirements—Part 11: Wireless LAN Medium Access Control (MAC) and Physical Layer (PHY) specifications; Amendmet 8: IEEE 802.11 Wireless Network Management; Aug. 2010; 426 Pages.

IEEE P802.11w/D4.0, Nov. 2007; Draft Standard for Information Technology—Telecommunications and information exchange between systems—Local and metropolitan area networks—Specific requirements—Part 11: Wireless LAN Medium Access Control (MAC) and Physical Layer (PHY) specifications Amendment 5: Protected Management Frames; Prepared by IEEE 802 Committee of the IEEE Computer Society; 63 pages.

IEEE P802.11ac/D0.2 Draft Standard for Information Technology Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz, Mar. 2011, 184 pages.

Notification of First Office Action issued on Feb. 19, 2016 corresponding to Chinese Patent Application No. 201280020850.7, 10 pgs.

Organized translation of Notice of Reasons for Rejection received on for Japanese Patent Application No. 2014-508139 dated Mar. 8, 2016, 4 pages.

\* cited by examiner

| Element ID | Length | OUI | Vendor-specific content |
|---|---|---|---|

Octets:  1  1  1  n-3

FIG. 9

| Element ID | Length | TSF 0 Offset | Interval/ Duration | Optional Subelements |
|---|---|---|---|---|

Octets:  1  1  8  4  variable

FIG. 13

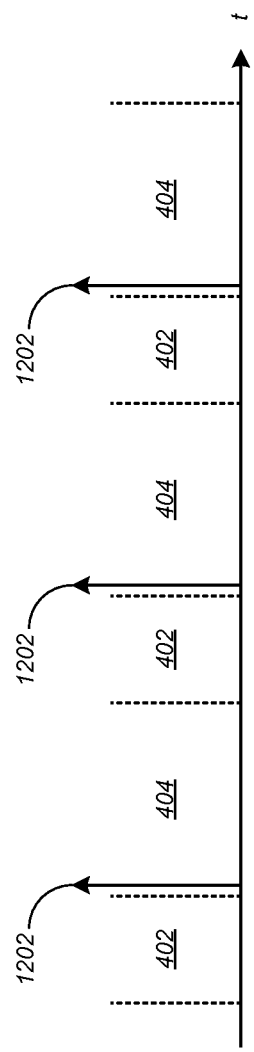

METHOD AND APPARATUS FOR FACILITATING THE COEXISTENCE OF WIRELESS COMMUNICATIONS OF DIFFERENT WIRELESS COMMUNICATION TECHNOLOGIES

CROSS-REFERENCE TO RELATED APPLICATIONS

The present disclosure is a continuation of U.S. patent application Ser. No. 13/458,227 (now U.S. Pat. No. 9,026, 162), filed on Apr. 27, 2012, which claims the benefit of U.S. Provisional Application No. 61/481,079, filed on Apr. 29, 2011. The entire disclosures of the applications referenced above are incorporated herein by reference.

FIELD

The present disclosure relates generally to wireless communications. More particularly, the present disclosure relates to coexistence between wireless local-area networking (WLAN) signals and wireless non-WLAN signals.

BACKGROUND

The popularity of various wireless networking technologies for handheld platforms has created a need to integrate multiple networking technologies on a single wireless communication device. Of these networking technologies, the two most widely used are wireless local-area networking (WLAN) and Bluetooth. Both of these technologies use the same un-licensed 2.4 GHz Industrial, Scientific and Medical (ISM) band. This situation poses a difficult problem for designing integrated circuits, external logic components, and wireless communication devices that allow these technologies to coexist. Because Bluetooth operates according to a known schedule, a multi-technology wireless communication device can schedule WLAN transmissions around the Bluetooth transmissions. However, because the Bluetooth schedule is not known to WLAN link partners, there are frequent collisions on the receive side. These collisions can reduce WLAN performance to one-half of baseline.

SUMMARY

In general, in one aspect, an embodiment features an apparatus configured to be implemented in a first wireless communication device, wherein the apparatus comprises: a memory configured to store a coexistence schedule, wherein the coexistence schedule defines wireless local-area network (WLAN) intervals and non-WLAN intervals; a WLAN transceiver configured to transmit WLAN signals in an independent basic service set (IBSS) network; a non-WLAN transceiver configured to transmit wireless non-WLAN signals; and a coexistence circuit configured to allow the WLAN transceiver to transmit the WLAN signals in the IBSS network only during the WLAN intervals, wherein the coexistence circuit is further configured to allow the non-WLAN transceiver to transmit the wireless non-WLAN signals only during the non-WLAN intervals; and wherein the coexistence circuit is further configured to cause the WLAN transceiver to transmit one or more coexistence request messages, wherein each of the coexistence request messages indicates a duration of at least one of a respective one of the WLAN intervals, and a respective one of the non-WLAN intervals.

Embodiments of the apparatus can include one or more of the following features. In some embodiments, the IBSS network comprises one or more second wireless communication devices; and responsive to the one or more coexistence request messages, the one or more second wireless communication devices transmit no WLAN signals during the respective non-WLAN intervals. In some embodiments, the non-WLAN signals comprise at least one of: Bluetooth signals; near field communication (NFC) signals; FM signals; and GPS signals. In some embodiments, at least one of the coexistence request messages comprises: a clear-to-send-to-self frame, wherein the clear-to-send-to-self frame includes a duration parameter, wherein the duration parameter indicates the duration of the respective one of the non-WLAN intervals. In some embodiments, at least one of the coexistence request messages comprises: a vendor-specific action frame, wherein the vendor-specific action frame includes a duration parameter, wherein the duration parameter indicates the duration of the respective one of the non-WLAN intervals. In some embodiments, at least one of the coexistence request messages comprises: a vendor-specific action frame, wherein the vendor-specific action frame includes a duration parameter, wherein the duration parameter indicates the duration of a period between a respective one of the non-WLAN intervals and another one of the non-WLAN intervals. Some embodiments comprise a wireless communication device comprising the apparatus. In some embodiments, the wireless communication device is implemented as one of: a mobile telephone; a personal digital assistant (PDA); a tablet computer; and a personal computer. In some embodiments, the wireless communication device is compliant with all or part of IEEE standard 802.11, including draft and approved amendments such as 802.11a, 802.11b, 802.11e, 802.11g, 802.11i, 802.11k, 802.11n, 802.11v, 802.11w, 802.11aa, 802.11ac, 802.11ad, 802.11ae, 802.11af, 802.11ah, and 802.11ai.

In general, in one aspect, an embodiment features non-transitory computer-readable media embodying instructions executable by a computer to perform functions comprising: storing a coexistence schedule, wherein the coexistence schedule defines wireless local-area network (WLAN) intervals and non-WLAN intervals; allowing a WLAN transceiver to transmit WLAN signals in an independent basic service set (IBSS) network only during the WLAN intervals; allowing a non-WLAN transceiver to transmit wireless non-WLAN signals only during the non-WLAN intervals; and causing the WLAN transceiver to transmit one or more coexistence request messages, wherein each of the coexistence request messages indicates a duration of at least one of a respective one of the WLAN intervals, and a respective one of the non-WLAN intervals.

Embodiments of the non-transitory computer-readable media can include one or more of the following features. In some embodiments, the IBSS network comprises one or more second wireless communication devices; and responsive to the one or more coexistence request messages, the one or more second wireless communication devices transmit no WLAN signals during the respective non-WLAN intervals. In some embodiments, the non-WLAN signals comprise at least one of: Bluetooth signals; near field communication (NFC) signals; FM signals; and GPS signals.

In general, in one aspect, an embodiment features an apparatus configured to be implemented in a first wireless communication device, wherein the apparatus comprises: a wireless local-area network (WLAN) transceiver configured to transmit WLAN signals in an independent basic service set (IBSS) network, wherein the IBSS network comprises one or more second wireless communication devices; and a coexistence circuit configured to allow the WLAN transceiver to transmit no WLAN signals during non-WLAN intervals responsive to the WLAN transceiver receiving coexistence request messages, wherein each coexistence request message indicates a duration of at least one of a respective one of the non-WLAN intervals, and a period between a respective one of the non-WLAN intervals and another one of the non-WLAN intervals.

Embodiments of the apparatus can include one or more of the following features. In some embodiments, the non-WLAN signals comprise at least one of: Bluetooth signals; near field communication (NFC) signals; FM signals; and GPS signals. In some embodiments, at least one of the coexistence request messages comprises: a clear-to-send-to-self frame, wherein the clear-to-send-to-self frame includes a duration parameter, wherein the duration parameter indicates the duration of the respective one of the non-WLAN intervals. In some embodiments, at least one of the coexistence request messages comprises: a vendor-specific action frame, wherein the vendor-specific action frame includes a duration parameter, wherein the duration parameter indicates a duration of the respective one of the non-WLAN intervals. In some embodiments, at least one of the coexistence request messages comprises: a vendor-specific action frame, wherein the vendor-specific action frame includes a duration parameter, wherein the duration parameter indicates a duration of a period between a respective one of the non-WLAN intervals and another one of the non-WLAN intervals. Some embodiments comprise a wireless communication device comprising the apparatus. In some embodiments, the wireless communication device is implemented as one of: a mobile telephone; a personal digital assistant (PDA); a tablet computer; and a personal computer. In some embodiments, the wireless communication device is compliant with all or part of IEEE standard 802.11, including draft and approved amendments such as 802.11a, 802.11b, 802.11e, 802.11g, 802.11i, 802.11k, 802.11n, 802.11v, 802.11w, 802.11aa, 802.11ac, 802.11ad, 802.11ae, 802.11af, 802.11ah, and 802.11ai.

The details of one or more implementations are set forth in the accompanying drawings and the description below. Other features will be apparent from the description and drawings, and from the claims.

BRIEF DESCRIPTION OF DRAWINGS

FIG. 9 shows the format of the vendor-specific information element according to the IEEE 802.11 standard.

FIG. 12 shows the timing of the transmission of the vendor-specific action frames with reference to the coexistence schedule of FIG. 4 according to an embodiment where the duration parameter indicates the duration of the current WLAN interval.

FIG. 13 shows the format of the Unscheduled Automatic Power Save Delivery (UAPSD) information element according to the IEEE 802.11 standard.

Figure 1:
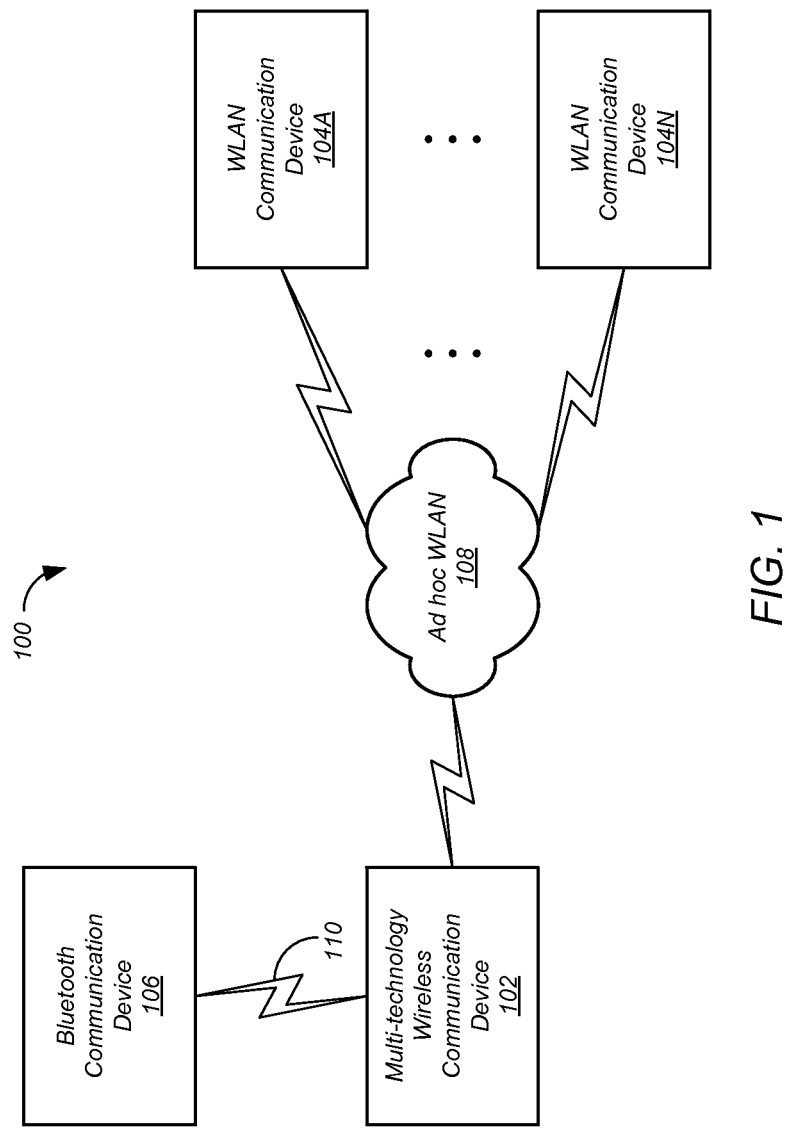
FIG. 1 shows elements of a multi-technology wireless communication system according to one embodiment.

The leading digit(s) of each reference numeral used in this specification indicates the number of the drawing in which the reference numeral first appears.

DESCRIPTION

Embodiments of the present disclosure provide coexistence for multi-technology wireless communication devices in an IEEE 802.11 independent basic service set (IBSS) networks. In particular, in one aspect, the disclosed embodiments describe coexistence for wireless local-area networking (WLAN) and Bluetooth technologies. However, while the disclosed embodiments are described in terms of WLAN and Bluetooth technologies, the disclosed techniques are applicable to other wireless technologies as well. The wireless technologies can include wireless non-WLAN signals other than Bluetooth. For example, the wireless non-WLAN signals can include near field communication (NFC) signals, FM signals, GPS signals, other ISM band signals, and the like.

According to the described embodiments, a multi-technology wireless communication device operates in an IBSS. The wireless technologies include wireless local-area network (WLAN) and wireless non-WLAN technologies. For example, the WLAN technology can be based on the IEEE 802.11 standard, and the non-WLAN technology can include Bluetooth signals, near field communication (NFC) signals, FM signals, GPS signals, other ISM band signals, and the like. The multi-technology wireless communication device includes a WLAN transceiver configured to transmit WLAN signals during WLAN intervals, and a non-WLAN transceiver configured to transmit wireless non-WLAN signals during non-WLAN intervals.

In accordance with one embodiment, a WLAN transceiver transmits a coexistence request message for each of the non-WLAN intervals. As used herein, the term the term "message" generally refers to a wireless electronic signal representing a digital message. Each coexistence request message indicates a duration of a respective one of the WLAN intervals, or a duration of a respective one of the non-WLAN intervals. In response to each coexistence request message, the other WLAN devices in the IBSS transmit no WLAN signals during the respective non-WLAN interval. The result is reduction or elimination of interference between the WLAN signals and the wireless non-WLAN signals.

FIG. 1 shows elements of a multi-technology wireless communication system 100 according to one embodiment. Although in the described embodiments the elements of multi-technology wireless communication system 100 are presented in one arrangement, other embodiments may feature other arrangements. For example, elements of multi-technology wireless communication system 100 can be implemented in hardware, software, or combinations thereof.

Referring to FIG. 1, multi-technology wireless communication system 100 includes a multi-technology wireless communication device 102, one or more WLAN communication devices 104A-N, and a Bluetooth communication device 106. Multi-technology wireless communication device 102 can be implemented as any wireless communication device capable of performing the functions described herein. For example, multi-technology wireless communication device 102 can be implemented as a mobile telephone such as a smartphone or feature phone, a personal digital assistant (PDA), a tablet computer, a personal computer, or the like.

WLAN communication devices 104 can be implemented as any wireless communication devices capable of performing the functions described herein. For example, each WLAN communication device 104 can be implemented as a mobile telephone such as a smartphone or feature phone, a personal digital assistant (PDA), a tablet computer, a personal computer, or the like. In addition, each WLAN communication device 104 can be implemented as a multi-technology wireless communication device 102, but this is not required.

Multi-technology wireless communication device 102 and WLAN communication devices 104 form an independent basic service set (IBSS). That is, multi-technology wireless communication device 102 and WLAN communication devices 104 communicate over an ad hoc WLAN 108. In some embodiments, ad hoc WLAN 108 is compliant with all or part of IEEE standard 802.11, including draft and approved amendments such as 802.11a, 802.11b, 802.11e, 802.11g, 802.11i, 802.11k, 802.11n, 802.11v, 802.11w, 802.11aa, 802.11ac, 802.11ad, 802.11ae, 802.11af, 802.11ah, and 802.11ai. Multi-technology wireless communication device 102 communicates with Bluetooth communication device 106 over a wireless Bluetooth link 110.

Figure 2:
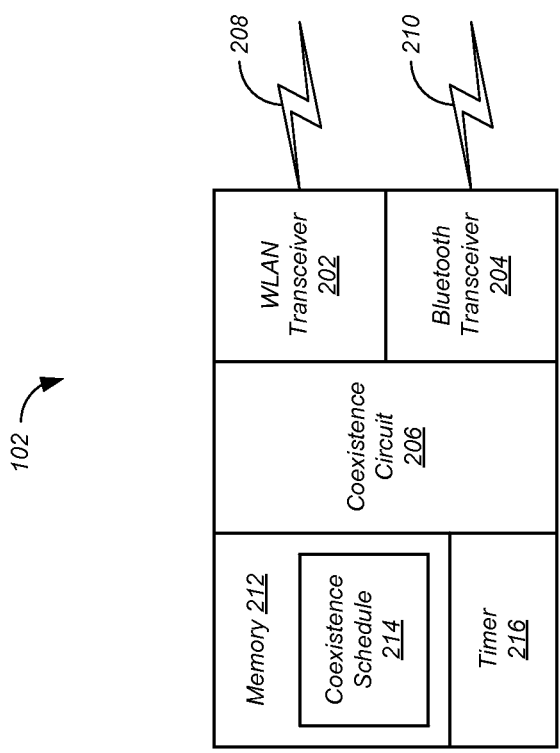
FIG. 2 shows detail of the multi-technology wireless communication device of FIG. 1 according to one embodiment.

FIG. 2 shows detail of multi-technology wireless communication device 102 of FIG. 1 according to one embodiment. Although in the described embodiments the elements of multi-technology wireless communication device 102 are presented in one arrangement, other embodiments may feature other arrangements. For example, elements of multi-technology wireless communication device 102 can be implemented in hardware, software, or combinations thereof.

Referring to FIG. 2, multi-technology wireless communication device 102 includes a WLAN transceiver 202, a Bluetooth transceiver 204, a coexistence circuit 206, a memory 212, and a timer 216. Coexistence circuit 206 can be implemented as a processor. WLAN transceiver 202, Bluetooth transceiver 204, coexistence circuit 206, memory 212, and timer 216 can be fabricated as one or more integrated circuits.

WLAN transceiver 202 transmits and receives (or transceives) WLAN signals 208 over ad hoc WLAN 108. Bluetooth transceiver 204 transceives Bluetooth signals 210 over Bluetooth link 110. Coexistence circuit 206 schedules WLAN transceiver 202 and Bluetooth transceiver 204 to prevent interference between WLAN signals 208 and Bluetooth signals 210 transmitted by multi-technology wireless communication device 102. Coexistence circuit 206 also causes WLAN transceiver 202 to transmit coexistence request messages over ad hoc WLAN 108 to prevent interference between Bluetooth signals 210 and WLAN signals 208 transmitted by WLAN communication devices 104. Memory 212 stores a coexistence schedule 214.

Figure 3:
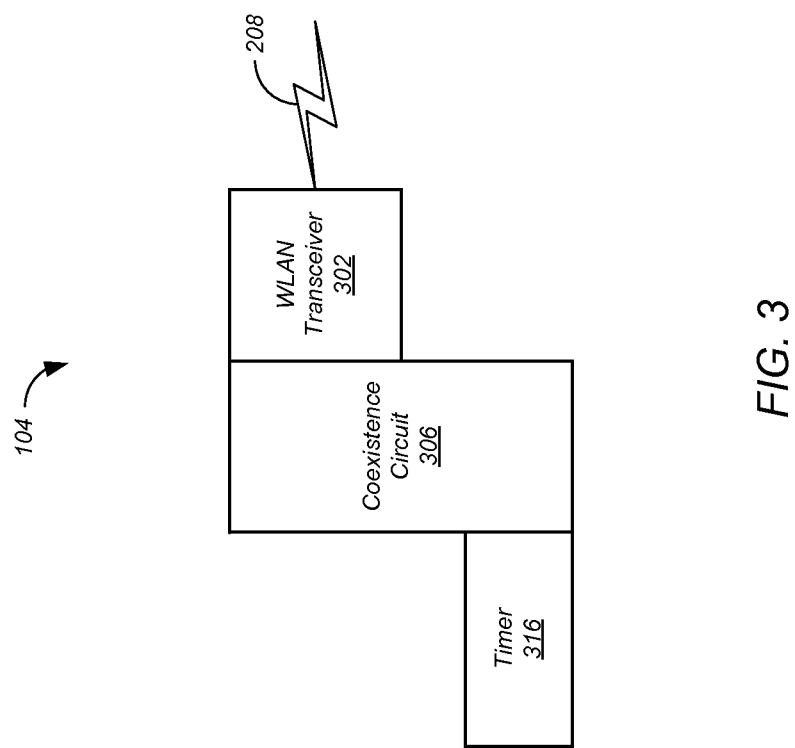
FIG. 3 shows detail of a WLAN communication device of FIG. 1 according to one embodiment.

FIG. 3 shows detail of a WLAN communication device 104 of FIG. 1 according to one embodiment. Although in the described embodiments the elements of WLAN communication device 104 are presented in one arrangement, other embodiments may feature other arrangements. For example, elements of WLAN communication device 104 can be implemented in hardware, software, or combinations thereof.

Referring to FIG. 3, WLAN communication device 104 includes a wireless local-area network (WLAN) transceiver 302, a coexistence circuit 306, and a timer 316. Coexistence circuit 306 can be implemented as a processor. WLAN transceiver 302, coexistence circuit 306, and timer 316 can be fabricated as one or more integrated circuits.

WLAN transceiver 302 transceives WLAN signals 208 over ad hoc WLAN 108. Coexistence circuit 306 schedules its WLAN transceiver 302 in accordance with the coexistence request messages transmitted by multi-technology wireless communication device 102 to prevent interference between WLAN signals 208 transmitted by WLAN communication devices 104 and Bluetooth signals 210.

Figure 4:
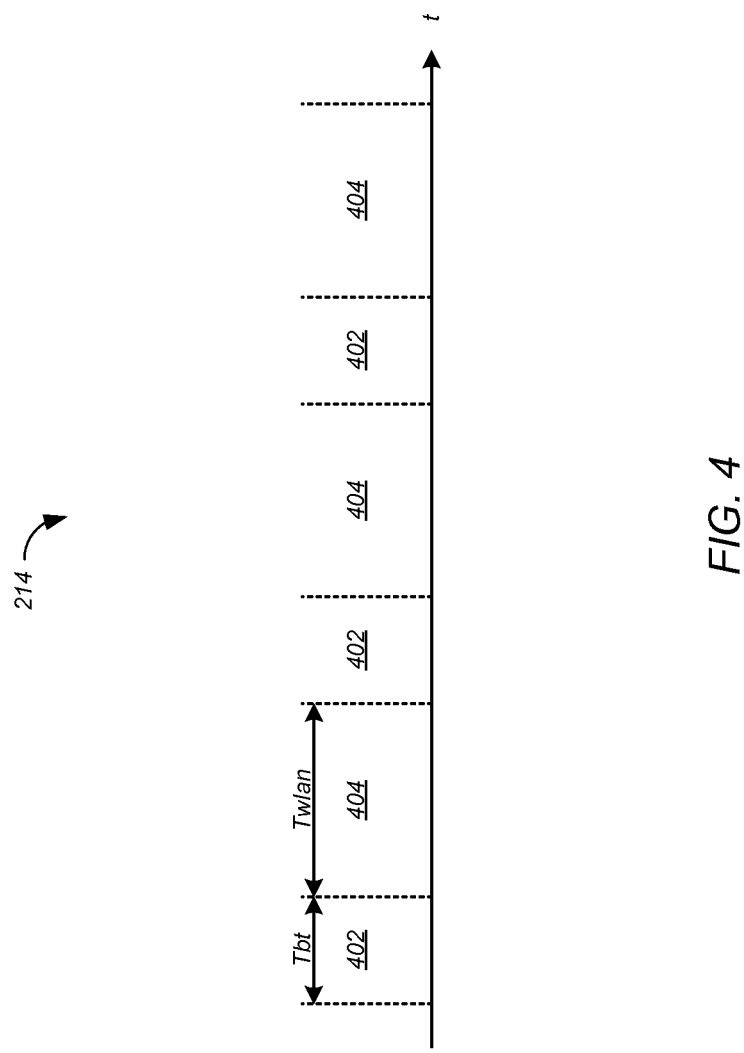
FIG. 4 illustrates a coexistence schedule according to one embodiment.

Multi-technology wireless communication device 102 communicates with Bluetooth communication device 106 over wireless Bluetooth link 110 according to coexistence schedule 214 and timer 216. FIG. 4 illustrates a coexistence schedule 214 according to one embodiment. Coexistence schedule 214 consists of Bluetooth intervals 402 and WLAN intervals 404. In general, the schedule is periodic, so that all Bluetooth intervals 402 have the same duration Tbt, and so that all WLAN intervals 404 have the same duration Twlan. However, this periodicity is not required. In general, the duration Twlan of WLAN intervals 404 is greater than the duration Tbt of Bluetooth intervals 402, but this is not required.

Coexistence schedule 214 is known to multi-technology wireless communication device 102. Therefore coexistence circuit 206 can control the transmissions of WLAN transceiver 202 and Bluetooth transceiver 204 deterministically according to coexistence schedule 214 and timer 216 so as to avoid interference between the transmissions. In particular, coexistence circuit 206 allows WLAN transceiver 202 to transmit WLAN signals 208 only during WLAN intervals 404, and allows Bluetooth transceiver 204 to transmit Bluetooth signals 210 only during Bluetooth intervals 402.

However, coexistence schedule 214 is not known to WLAN communication devices 104. To prevent interference between the transmissions of WLAN communication devices 104 and Bluetooth signals 210, coexistence circuit 206 of multi-technology wireless communication device 102 causes WLAN transceiver 202 to transmit coexistence request messages. Each coexistence request message indicates a duration of one of the WLAN intervals 404, or a duration of one of the Bluetooth intervals 402. At each WLAN communication device 104, responsive to the WLAN transceiver 302 receiving a coexistence request message, coexistence circuit 306 allows the WLAN transceiver 302 to transmit no WLAN signals 208 during one of the Bluetooth intervals 402. Bluetooth communication device 106 has knowledge of coexistence schedule 214, and so transmits Bluetooth signals 210 only during Bluetooth intervals 402.

Figure 5:
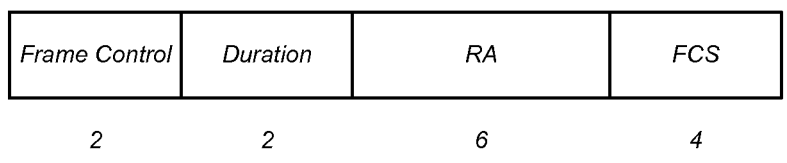
FIG. 5 shows the format of the CTS-to-self frame according to the IEEE 802.11g standard.

In some embodiments, the coexistence request message is implemented as a clear-to-send-to-self (CTS-to-self) frame. FIG. 5 shows the format of the CTS-to-self frame according to the IEEE 802.11g standard. The CTS-to-self frame includes a two-octet Frame Control field, a two-octet Duration field, a six-octet Receiver Address (RA) field, and a four-octet Frame Check Sequence (FCS) field. The RA field contains the MAC address of multi-technology wireless communication device 102. The duration field contains a duration parameter that indicates the duration of the next Bluetooth interval 402.

Figure 6:
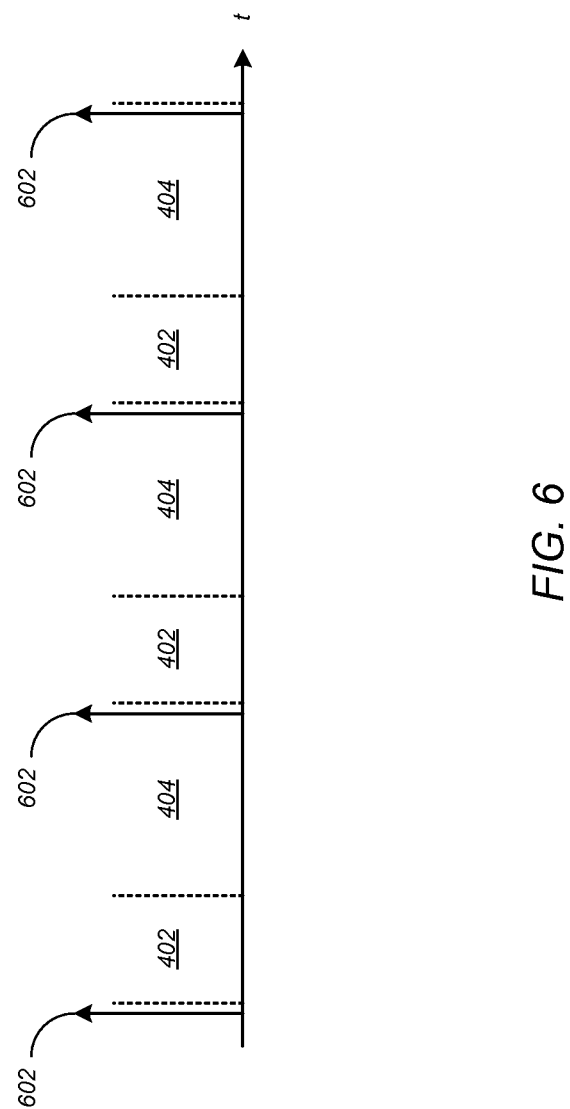
FIG. 6 shows the timing of the transmission of the CTS-to-self frames with reference to the coexistence schedule of FIG. 4 according to one embodiment.

FIG. 6 shows the timing of the transmission of the CTS-to-self frames with reference to coexistence schedule 214 of FIG. 4 according to one embodiment. Referring to FIG. 6, coexistence circuit 206 of multi-technology wireless communication device 102 causes WLAN transceiver 202 to transmit a CTS-to-self frame 602 just prior to the start of each Bluetooth interval 402. The duration parameter of each CTS-to-self frame 602 indicates the duration of the subsequent Bluetooth interval 402. WLAN transceivers 302 of WLAN communication devices 104 receive CTS-to-self frames 602.

At each WLAN communication device 104, responsive to the WLAN transceiver 302 receiving a CTS-to-self frame 602, coexistence circuit 306 allows the WLAN transceiver 302 to transmit no WLAN signals 208 for the interval specified by the duration parameter in that CTS-to-self frame 602. That is, coexistence circuit 306 allows the WLAN transceiver 302 to transmit no WLAN signals 208 during the subsequent Bluetooth interval 402.

Figure 7:
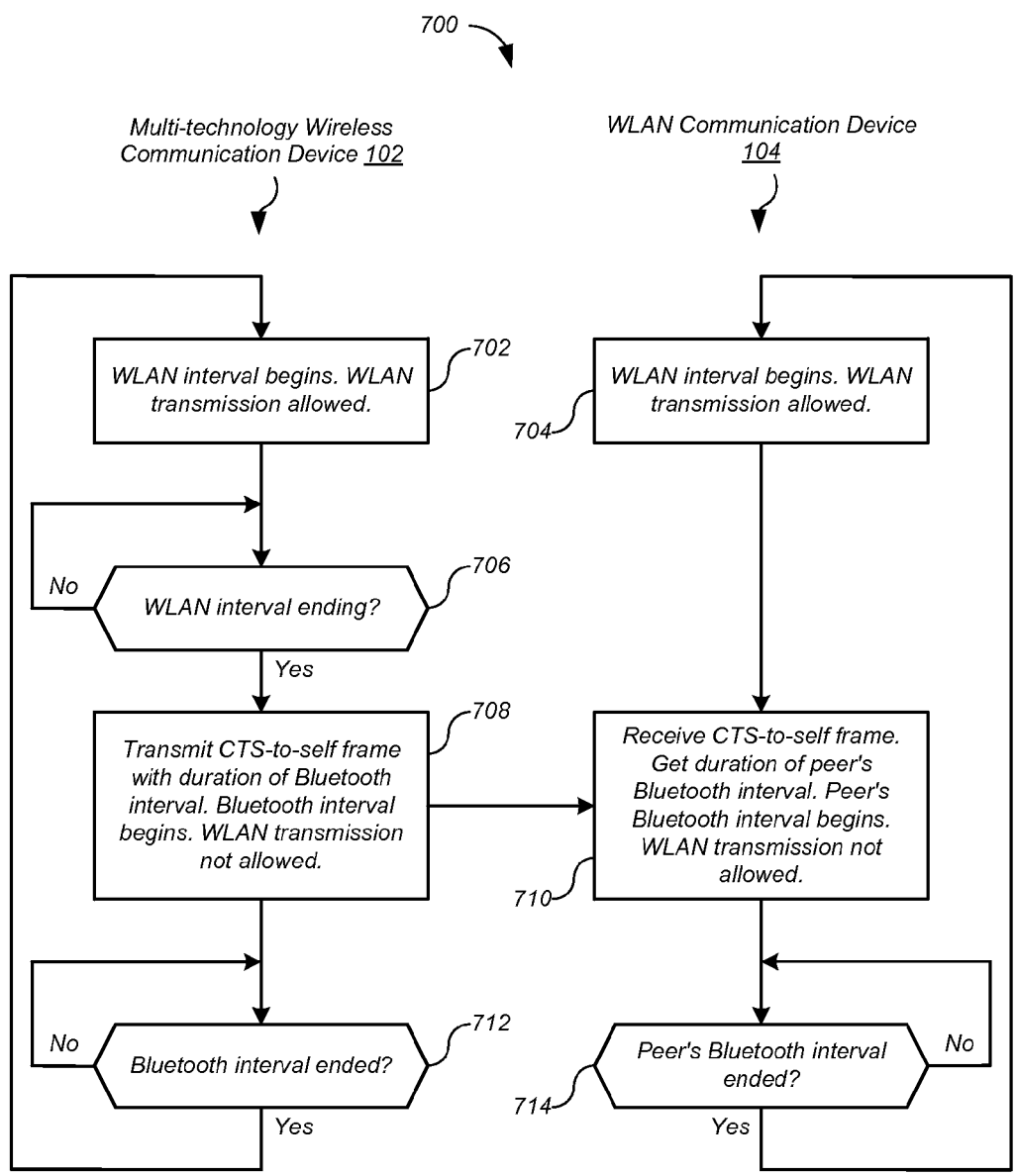
FIG. 7 shows a process for the multi-technology wireless communication system of FIG. 1 according to the embodiment of FIG. 6.

FIG. 7 shows a process 700 for multi-technology wireless communication system 100 of FIG. 1 according to the embodiment of FIG. 6. Although in the described embodiments the elements of process 700 are presented in one arrangement, other embodiments may feature other arrangements. For example, in various embodiments, some or all of the elements of process 700 can be executed in a different order, concurrently, and the like. Also some elements of process 700 may not be performed, and may not be executed immediately after each other. FIG. 7 is arranged in two columns, with processes of multi-technology wireless communication device 102 shown in the left-hand column, and with processes of a WLAN communication device 104 shown in the right-hand column.

Referring to FIG. 7, at 702 and 704, a WLAN interval 404 begins. During WLAN interval 404, WLAN transmission is allowed for both multi-technology wireless communication device 102 and WLAN communication device 104. At 706, multi-technology wireless communication device 102 determines when the WLAN interval 404 is ending. In particular, coexistence circuit 206 of multi-technology wireless communication device 102 consults the coexistence schedule 214 stored in memory 212 and timer 216. At 708, just prior to the end of the WLAN interval 404, multi-technology wireless communication device 102 transmits a CTS-to-self frame 602 that includes the duration of the following Bluetooth interval 402. Then the Bluetooth interval 402 begins. Coexistence circuit 206 does not allow WLAN transmission by multi-technology wireless communication device 102 during Bluetooth interval 402.

At 710, WLAN communication device 104 receives the CTS-to-self frame 602, and gets the duration of the Bluetooth interval 402 from that frame 602. Bluetooth interval 402 begins. Coexistence circuit 306 does not allow WLAN transmission by WLAN communication device 104 during Bluetooth interval 402.

At 712, multi-technology wireless communication device 102 determines when the Bluetooth interval 402 has ended. In particular, coexistence circuit 206 of multi-technology wireless communication device 102 consults timer 216 and the coexistence schedule 214 stored in memory 212. When the Bluetooth interval 402 ends, the next WLAN interval begins at 702. Coexistence circuit 206 allows WLAN transmission by multi-technology wireless communication device 102 during WLAN interval 404.

At 714, WLAN communication device 104 determines when the peer's Bluetooth interval 402 has ended (that is, when the Bluetooth interval 402 for multi-technology wireless communication device 102 has ended). In particular, coexistence circuit 306 of WLAN communication device 104 uses timer 316 and the duration from the CTS-to-self frame 602 to determine when the peer's Bluetooth interval 402 has ended. When the peer's Bluetooth interval 402 ends, the next WLAN interval begins at 704. Coexistence circuit 306 allows WLAN transmission by WLAN communication device 104 during WLAN interval 404.

In some embodiments, the coexistence request message is implemented as a vendor-specific action frame, where the vendor-specific action frame includes a duration parameter. The coexistence request message can also be sent using beacons and probe request/response messages when possible. In some embodiments, the duration parameter indicates the duration of the following Bluetooth interval 402. In other embodiments, the duration parameter indicates the duration of the current WLAN interval 404.

Figure 8:
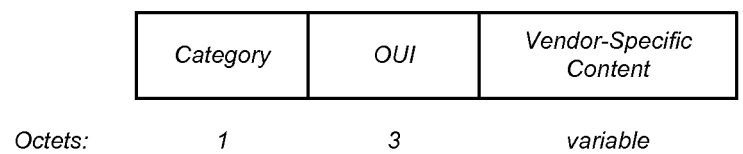
FIG. 8 shows the format of the vendor-specific action frame according to the IEEE 802.11 standard.

FIG. 8 shows the format of the vendor-specific action frame according to the IEEE 802.11 standard. Referring to FIG. 8, the vendor-specific action frame includes a one-octet Category field, a three-octet OUI field, and a variable-length Vendor-Specific Content field. The Category field is set to the value indicating the vendor-specific category. The OUI field contains a public OUI, assigned by the IEEE, of the entity that has defined the content of the particular vendor-specific action. The Vendor-Specific Content field contains one or more vendor-specific fields. In the described embodiment, the Vendor-Specific Content field contains the vendor-specific information element.

In some embodiments, the vendor-specific action frame includes a vendor-specific information element that includes the duration parameter. FIG. 9 shows the format of the vendor-specific information element according to the IEEE 802.11 standard. Referring to FIG. 9, the vendor-specific information element includes a one-octet Element ID field, a one-octet Length field, a three-octet OUI field, and a variable-length Vendor-Specific Content field. The Element ID field indicates the information element is a vendor-specific information element. The OUI field contains a public OUI assigned by the IEEE. The Vendor-Specific Content field contains one or more vendor-specific fields. In the described embodiment, the Vendor-Specific Content field contains the duration parameter. In other embodiments, the vendor-specific action frame includes a WiFi Direct Notice of Absence element that includes the duration parameter.

Figure 10:
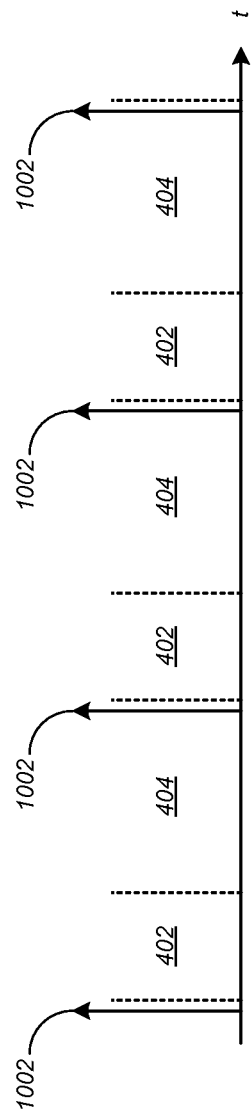
FIG. 10 shows the timing of the transmission of the vendor-specific action frames with reference to the coexistence schedule of FIG. 4 according to an embodiment where the duration parameter indicates the duration of the following Bluetooth interval.

FIG. 10 shows the timing of the transmission of the vendor-specific action frames with reference to coexistence schedule 214 of FIG. 4 according to an embodiment where the duration parameter indicates the duration of the following Bluetooth interval 402. Referring to FIG. 10, coexistence circuit 206 of multi-technology wireless communication device 102 causes WLAN transceiver 202 to transmit a vendor-specific action frame 1002 just prior to the start of each Bluetooth interval 402. The duration parameter of each vendor-specific action frame 1002 indicates the duration of the subsequent Bluetooth interval 402. WLAN transceivers 302 of WLAN communication devices 104 receive the vendor-specific action frames 1002.

At each WLAN communication device 104, responsive to the WLAN transceiver 302 receiving a vendor-specific action frame 1002, coexistence circuit 306 allows the WLAN transceiver 302 to transmit no WLAN signals 208 for the interval specified by the duration parameter in that vendor-specific action frame 1002. That is, coexistence circuit 306 allows the WLAN transceiver 302 to transmit no WLAN signals 208 during the subsequent Bluetooth interval 402.

Figure 11:
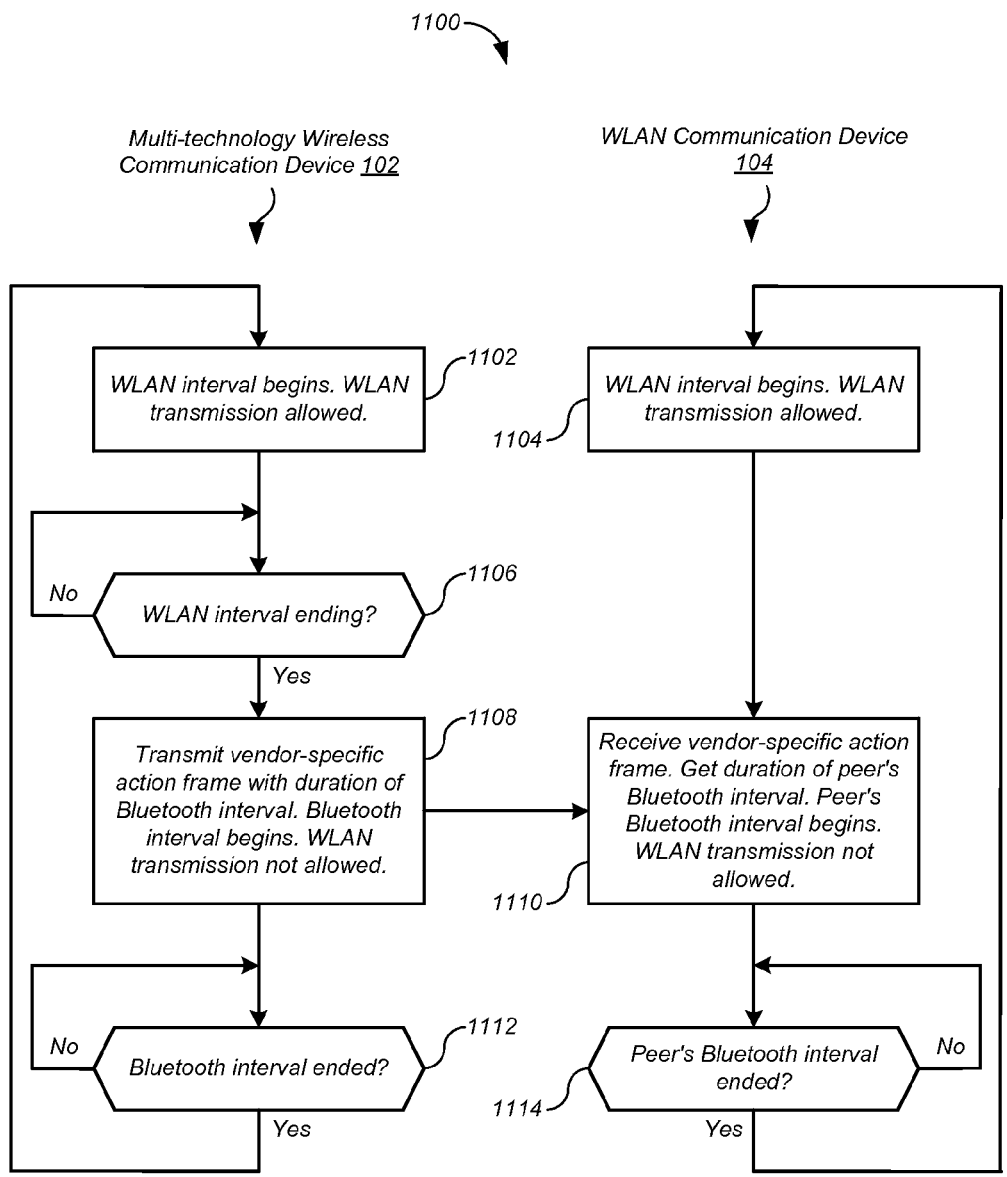
FIG. 11 shows a process for the multi-technology wireless communication system of FIG. 1 according to the embodiment of FIG. 10.

FIG. 11 shows a process 1100 for multi-technology wireless communication system 100 of FIG. 1 according to the embodiment of FIG. 10. Although in the described embodiments the elements of process 1100 are presented in one arrangement, other embodiments may feature other arrangements. For example, in various embodiments, some or all of the elements of process 1100 can be executed in a different order, concurrently, and the like. Also some elements of process 1100 may not be performed, and may not be executed immediately after each other. FIG. 11 is arranged in two columns, with processes of multi-technology wireless communication device 102 shown in the left-hand column, and with processes of a WLAN communication device 104 shown in the right-hand column.

Referring to FIG. 11, at 1102 and 1104, a WLAN interval 404 begins. During WLAN interval 404, WLAN transmission is allowed for both multi-technology wireless communication device 102 and WLAN communication device 104. At 1106, multi-technology wireless communication device 102 determines when the WLAN interval 404 is ending. In particular, coexistence circuit 206 of multi-technology wireless communication device 102 consults the coexistence schedule 214 stored in memory 212 and timer 216. At 1108, prior to the end of the WLAN interval 404, multi-technology wireless communication device 102 transmits a vendor-specific action frame 1002 that includes the duration of the following Bluetooth interval 402. Then the Bluetooth interval 402 begins. Coexistence circuit 206 does not allow WLAN transmission by multi-technology wireless communication device 102 during Bluetooth interval 402.

At 1110, WLAN communication device 104 receives the vendor-specific action frame 1002, and gets the duration of the Bluetooth interval 402 from that frame 1002. Bluetooth interval 402 begins. Coexistence circuit 306 does not allow WLAN transmission by WLAN communication device 104 during Bluetooth interval 402.

At 1112, multi-technology wireless communication device 102 determines when the Bluetooth interval 402 has ended. In particular, coexistence circuit 206 of multi-technology wireless communication device 102 consults timer 216 and the coexistence schedule 214 stored in memory 212. When the Bluetooth interval 402 ends, the next WLAN interval begins at 1102. Coexistence circuit 206 allows WLAN transmission by multi-technology wireless communication device 102 during WLAN intervals 404.

At 1114, WLAN communication device 104 determines when the peer's Bluetooth interval 402 has ended (that is, when the Bluetooth interval 402 for multi-technology wireless communication device 102 has ended). In particular, coexistence circuit 306 of WLAN communication device 104 uses timer 316 and the duration from the vendor-specific action frame 1002 to determine when the peer's Bluetooth interval 402 has ended. When the peer's Bluetooth interval 402 ends, the next WLAN interval 404 begins at 1104. Coexistence circuit 306 allows WLAN transmission by WLAN communication device 104 during WLAN intervals 404.

FIG. 12 shows the timing of the transmission of the vendor-specific action frames with reference to coexistence schedule 214 of FIG. 4 according to an embodiment where the duration parameter indicates the duration of the current WLAN interval 404. Referring to FIG. 12, coexistence circuit 206 of multi-technology wireless communication device 102 causes WLAN transceiver 202 to transmit a vendor-specific action frame 1202 at the start of each WLAN interval 404. The duration parameter of each vendor-specific action frame 1202 indicates the duration of that WLAN interval 404. WLAN transceivers 302 of WLAN communication devices 104 receive vendor-specific action frames 1202.

At each WLAN communication device 104, responsive to the WLAN transceiver 302 receiving a vendor-specific action frame 1202, coexistence circuit 306 allows the WLAN transceiver 302 to transmit WLAN signals 208 only during the interval specified by the duration parameter in that vendor-specific action frame 1202. That is, coexistence circuit 306 allows the WLAN transceiver 302 to transmit WLAN signals 208 only during that WLAN interval 404.

In some embodiments, the vendor-specific action frame includes an Unscheduled Automatic Power Save Delivery (UAPSD) information element that includes the duration parameter. FIG. 13 shows the format of the UAPSD information element according to the IEEE 802.11 standard. Referring to FIG. 13, the UAPSD information element includes a one-octet Element ID field, a one-octet Length field, an eight-octet TSF 0 Offset field, a four-octet Interval/Duration field, and a variable-length Optional Subelements field.

The Element ID field contains a predetermined value that identifies the information element as being the UAPSD information element. The value of the Length field is 12 plus the length of any additional subelements present. The TSF 0 Offset field is not required in this embodiment. The Interval/Duration field contains the duration parameter. The Optional Subelements field format contains zero or more subelements.

Figure 14:
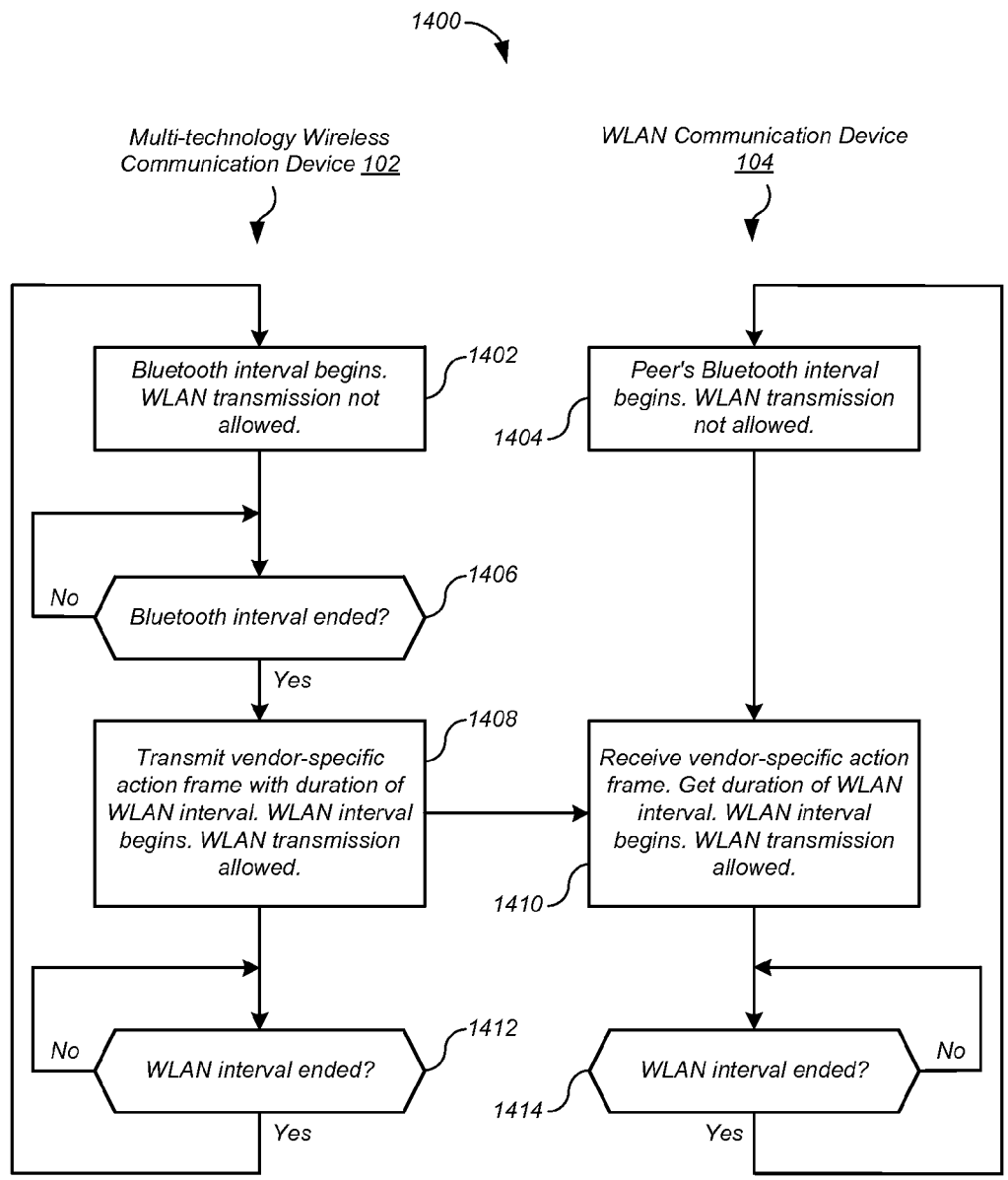
FIG. 14 shows a process for the multi-technology wireless communication system of FIG. 1 according to the embodiment of FIG. 13.

FIG. 14 shows a process 1400 for multi-technology wireless communication system 100 of FIG. 1 according to the embodiment of FIG. 13. Although in the described embodiments the elements of process 1400 are presented in one arrangement, other embodiments may feature other arrangements. For example, in various embodiments, some or all of the elements of process 1400 can be executed in a different order, concurrently, and the like. Also some elements of process 1400 may not be performed, and may not be executed immediately after each other. FIG. 14 is arranged in two columns, with processes of multi-technology wireless communication device 102 shown in the left-hand column, and with processes of a WLAN communication device 104 shown in the right-hand column.

Referring to FIG. 14, at 1402 and 1404, a Bluetooth interval 402 begins for multi-technology wireless communication device 102. During Bluetooth interval 402, WLAN transmission is not allowed for either multi-technology wireless communication device 102 or WLAN communication device 104. At 1406, multi-technology wireless communication device 102 determines when the Bluetooth interval 402 has ended. In particular, coexistence circuit 206 of multi-technology wireless communication device 102 consults the coexistence schedule 214 stored in memory 212 and timer 216. At 1408, after the end of the Bluetooth interval 402, multi-technology wireless communication device 102 transmits a vendor-specific action frame 1302 that includes the duration of the current WLAN interval 404. Coexistence circuit 206 allows WLAN transmission by multi-technology wireless communication device 102 only during WLAN intervals 404.

At 1410, WLAN communication device 104 receives the vendor-specific action frame 1302, and gets the duration of the WLAN interval 404 from that frame 1302. WLAN interval 404 has begun. Coexistence circuit 306 allows WLAN transmission by WLAN communication device 104 only during WLAN intervals 404.

At 1412, multi-technology wireless communication device 102 determines when the WLAN interval 404 has ended. In particular, coexistence circuit 206 of multi-technology wireless communication device 102 consults timer 216 and the coexistence schedule 214 stored in memory 212. When the WLAN interval 404 ends, the next Bluetooth interval begins at 1402. Coexistence circuit 206 does not allow WLAN transmission by multi-technology wireless communication device 102 during Bluetooth intervals 402.

At 1414, WLAN communication device 104 determines when the WLAN interval 404 has ended. In particular, coexistence circuit 306 of WLAN communication device 104 uses timer 316 and the duration from the vendor-specific action frame 1302 to determine when the WLAN interval 404 has ended. When the WLAN interval 404 ends, the next Bluetooth interval 402 begins at 1404. Coexistence circuit 306 doe not allow WLAN transmission by WLAN communication device 104 during Bluetooth intervals 402.

Multiple embodiments have been described using CTS-to-self frames and vendor-specific action frames. In some devices, only one of these embodiments are implemented. In other devices, two or more of these embodiments are implemented, and are selected dynamically according to factors such as network conditions. For example, embodiments that employ CTS-to-self frames can be selected when the IBSS includes only one multi-technology wireless communication device 102 and one WLAN communication device 104 and no other IBSS is nearby. As another example, embodiments that employ vendor-specific action frames can be selected when the IBSS includes multiple WLAN communication devices 104.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. A first wireless communication device, comprising:
    a first transceiver configured to transmit first signals according to a first wireless communication technology;
    a second transceiver configured to transmit second signals according to a second wireless communication technology;
    a memory configured to store a schedule, wherein the schedule identifies (i) first intervals for allowing communication using the first signals, and (ii) second intervals for allowing communication using the second signals; and
    a coexistence circuit configured to (i) allow the first transceiver to transmit the first signals only during the first intervals, (ii) allow the second transceiver to transmit the second signals only during the second intervals, and (iii) cause the first transceiver to transmit, prior to each of the first intervals ending and each of the second intervals beginning, a message to a second wireless communication device, the message indicating a duration of a respective one of the second intervals, wherein, in response to the message, transmission by the second wireless communication device according to the first wireless communication technology is not allowed during the respective one of the second intervals,
    wherein the message includes a vendor-specific action frame including a duration parameter, and wherein the duration parameter indicates one of the duration of the respective one of the second intervals and a duration of a period between adjacent ones of the first intervals and the second intervals.

2. The first wireless communication device of claim 1, wherein:
    the first transceiver corresponds to a wireless local area network (WLAN) transceiver; and
    the second transceiver corresponds to a non-WLAN transceiver.

3. The first wireless communication device of claim 2, wherein the second signals transmitted by the second transceiver correspond to Bluetooth signals, near field communication signals, frequency modulated (FM) signals, and/or global positioning system signals.

4. The first wireless communication device of claim 1, wherein the first transceiver is configured to transmit the first signals in an independent basic service set (IBSS) network.

5. The first wireless communication device of claim 1, wherein the first wireless communication device corresponds to a mobile telephone, a tablet computer, and/or a personal computer.

6. A method for operating a first wireless communication device that is operable to (i) transmit first signals according to a first wireless communication technology, and (ii) transmit second signals according to a second wireless communication technology, the method comprising:
  storing a schedule, wherein the schedule identifies (i) first intervals for allowing communication using the first signals and (ii) second intervals for allowing communication using the second signals;
  allowing the first wireless communication device to transmit the first signals only during the first intervals;
  allowing the first wireless communication device to transmit the second signals only during the second intervals; and
  causing the first wireless communication device to transmit, prior to each of the first intervals ending and each of the second intervals beginning, a message to a second wireless communication device, the message indicating a duration of a respective one of the second intervals, wherein, in response to the message, transmission by the second wireless communication device according to the first wireless communication technology is not allowed during the respective one of the second intervals,
  wherein the message includes a vendor-specific action frame including a duration parameter, and wherein the duration parameter indicates one of the duration of the respective one of the second intervals and a duration of a period between adjacent ones of the first intervals and the second intervals.

7. The method of claim 6, wherein:
the first signals correspond to wireless local area network (WLAN) signals; and
the second signals correspond to non-WLAN signals.

8. The method of claim 7, wherein the second signals correspond to Bluetooth signals, near field communication signals, frequency modulated (FM) signals, and/or global positioning system signals.

9. The method of claim 6, wherein the first signals are transmitted in an independent basic service set (IBSS) network.

10. The method of claim 6, wherein the first wireless communication device corresponds to a mobile telephone, a tablet computer, and/or a personal computer.

* * * * *